(12) United States Patent
Bhatnagar et al.

(10) Patent No.: US 11,381,483 B2
(45) Date of Patent: Jul. 5, 2022

(54) MAINTENANCE RECOMMENDATION FOR CONTAINERIZED SERVICES

(71) Applicant: VMWARE, INC., Palo Alto, CA (US)

(72) Inventors: Yash Bhatnagar, Bangalore (IN); Naina Verma, Bangalore (IN); Keerthanaa K, Bangalore (IN); Sivaraj M, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/079,407

(22) Filed: Oct. 23, 2020

(65) Prior Publication Data

US 2022/0052933 A1 Feb. 17, 2022

(30) Foreign Application Priority Data

Aug. 15, 2020 (IN) .............................. 202041035222

(51) Int. Cl.

| | | |
|---|---|---|
| *G06F 15/173* | (2006.01) | |
| *H04L 43/045* | (2022.01) | |
| *H04L 43/0876* | (2022.01) | |
| *H04L 43/0817* | (2022.01) | |
| *H04L 47/78* | (2022.01) | |
| *H04L 41/22* | (2022.01) | |
| *H04L 67/12* | (2022.01) | |
| *H04L 47/76* | (2022.01) | |
| *H04L 41/5067* | (2022.01) | |

(52) U.S. Cl.
CPC ............ *H04L 43/045* (2013.01); *H04L 41/22* (2013.01); *H04L 41/5067* (2013.01); *H04L 43/0817* (2013.01); *H04L 43/0876* (2013.01); *H04L 47/76* (2013.01); *H04L 47/781* (2013.01); *H04L 67/12* (2013.01)

(58) Field of Classification Search
CPC ... H04L 43/045; H04L 41/22; H04L 41/5067; H04L 43/0817; H04L 43/0876; H04L 47/76; H04L 47/781; H04L 67/12
See application file for complete search history.

(56) References Cited

U.S. PATENT DOCUMENTS

| | | | | |
|---|---|---|---|---|
| 5,216,612 A | * | 6/1993 | Cornett | .................. G06Q 10/06 700/96 |
| 2013/0326531 A1 | * | 12/2013 | Kenkre | ................ G06Q 10/087 718/104 |
| 2014/0222490 A1 | * | 8/2014 | Kenkre | ................ G06Q 10/087 705/7.23 |
| 2016/0378615 A1 | * | 12/2016 | Cohen | .................. G06F 11/3055 714/19 |

(Continued)

OTHER PUBLICATIONS

VMware Tanzu Observability by Wavefront; What is Wavefront?; Archived: May 9, 2020 (8 pgs) https://web.archive.org/web/20200509174717/https://docs.wavefront.com/wavefront_introduction.html.

(Continued)

*Primary Examiner* — Padma Mundur

(57) ABSTRACT

A maintenance recommendation for containerized services can find a time to perform maintenance on a particular service based on resource usage patterns such that the maintenance will have a reduced impact on dependent services. The dependent services can be determined for the particular service based on network interactions between the services.

20 Claims, 12 Drawing Sheets

(56) References Cited

U.S. PATENT DOCUMENTS

2020/0327708 A1* 10/2020 Garvey .................. G06T 11/001
2020/0366752 A1* 11/2020 White .................. G06F 11/3409

OTHER PUBLICATIONS

Lesson 4: Seasonal Models; Accessed Prior to: Jul. 14, 2020 (21 pgs) https://online.stat.psu.edu/stat510/book/export/html/666.

Chargin;, "vSphere 7—Announcing General Availability of the New Generation of vSphere"; VMware Blogs, Apr. 2, 2020 (13 pgs) https://blogs.vmware.com/vsphere/2020/04/vsphere-7-new-generation-vsphere.html.

VMware Tanzu Observability by Wavefront; Distrubted Tracing Overview; Accessed Prior to: Jul. 14, 2020 (10 pgs) https://docs.wavefront.com/tracing_basics.html#:~:text=Traces%20Wavefront%20represents%20an%20individual,of%20work%20in%20the%20trace.

Grogan;, "SARIMA vs. Prophet: Forecasting Seasonal Weather Data"; Analytics Vidhya, Aug. 28, 2019 (16 pgs) https://medium.com/analytics-vidhya/sarima-forecasting-seasonal-data-with-python-and-r-2e7472dfad83.

Puech, et al., "A Fully Automated Perodicity Detection in time Series"; Accessed Prior to: Jul. 14, 2020 (12 pgs) https://project.inria.fr/aaltd19/files/2019/08/AALTD_19_Boussard.pdf.

Ostertagova, et al., "Regression Anaylsis and Seasonal Adjustment of Time Series"; Sciepub, Journal of Automation and Control; vol. 3, No. 3, (2015) Archived: Jan. 21, 2020 (7 pgs) https://web.archive.org/web/20200121171341/http://pubs.sciepub.com/automation/3/3/16/index.html.

Stava;, "A Complete Tutorial on Time Series Modeling in R"; Analytics Vidhya, Dec. 16, 2015 (48 pgs) https://www.analyticsvidhya.com/blog/2015/12/complete-tutorial-time-series-modeling/.

Prabhakaran;, "ARIMA Model—Complete Guide to Time Series Forecasting in Python", ML + Lets DataScience; Archived: Jul. 8, 2020 (25 pgs) https://web.archive.org/web/20200708152952/https://www.machinelearningplus.com/time-series/arima-model-time-series-forecasting-python/.

Graves;, "Time Series Forecasting with a SARIMA Model"; Towards Data Science, Jan. 7, 2020 (12 pgs) https://towardsdatascience.com/time-series-forecasting-with-a-sarima-model-db051b7ae459.

Singh;, 7 Methods to Perform Time Series Forecasting (with Python Codes); Analytics Vidhya, Feb. 8, 2018 (52 pgs) https://www.analyticsvidhya.com/blog/2018/02/time-series-forecasting-methods/.

Kubernetes; Production-Grade Container Orchestration, Automated Container Deployment, Scaling & Management; Archived: Jan. 4, 2020 (10 pgs) https://web.archive.org/web/20200104220500/https://kubernetes.io/.

Grafana Labs; Grafana Documentation; Archived: Jan. 20, 2020 (5 pgs) https://web.archive.org/web/20200120011946/https://grafana.com/docs/grafana/latest/.

Burillo;, "Kubernetes Monitoring with Prometheus—The Ultimate Guide (Part 1)"; Sysdig, Aug. 16, 2018 (13 pgs) https://sysdig.com/blog/kubernetes-monitoring-prometheus/.

Datadog Docs; Archived: Feb. 18, 2020 (2 pgs) https://web.archive.org/web/20200218205310if_/https://docs.datadoghq.com/.

* cited by examiner

MAINTENANCE RECOMMENDATION FOR CONTAINERIZED SERVICES

RELATED APPLICATIONS

Benefit is claimed under 35 U.S.C. 119(a)-(d) to Foreign Application Serial No. 202041035222 filed in India entitled "MAINTENANCE RECOMMENDATION FOR CONTAINERIZED SERVICES", on Aug. 15, 2020, by VMware, Inc., which is herein incorporated in its entirety by reference for all purposes.

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs), such as virtual machines and containers, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

VCIs can be used to provide the enterprise's applications. Such applications may be made up of one or more services. Maintenance of systems, applications, and services is a frequent and inevitable process that involves downtime, during which at least one service is not available to the end customers for use.

DETAILED DESCRIPTION

Figure 1A:
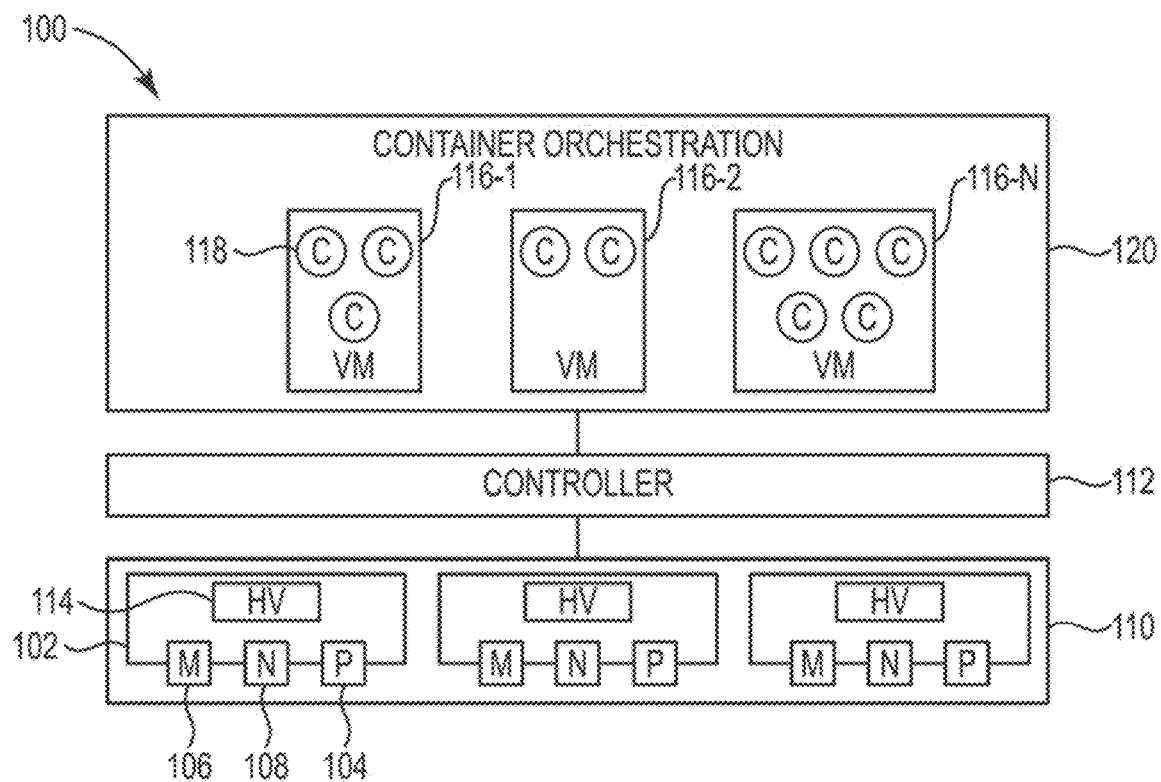
FIG. 1A is a diagram of an example of a container orchestration as an application in a system for a maintenance recommendation for containerized services.

In order to attenuate the impact of maintenance to services provided by a data center, the maintenance is typically performed in off-peak hours of the usage of the applications. For example, maintenance may be performed between 2 a.m. and 6 a.m. local time to provide a natural shield from customer impact. However, for applications involving global end users, determining a good time to perform maintenance is not obvious and requires extensive analysis and understanding of customer usage patterns. Such evaluations can be time and effort intensive and error prone. The problem is complicated further in an SDDC environment that involves a dense interaction between services, such as in a container orchestration system. In such systems, multiple services are used by other services, making it difficult to understand the impact of downtime of one service on end users of the service and of other dependent services. A dependent service is a service that relies on the operation of another service for at least a portion of its functionality. For example, any number of applications may share a login service and thus be dependent thereon.

In some previous approaches, such systems may follow a broadcast approach, where the service owners performing any maintenance select a particular interval based cursory analysis, and broadcast messages to all other services about the downtime. It is then the responsibility of the dependent service owning teams to report back if there is a significant problem with the downtime. Such approaches do not scale well as the number of services and/or the interrelated dependencies therebetween grow.

However, according to at least one embodiment of the present disclosure, the dependencies of various services provided by a data center can be determined and understood automatically. Furthermore, collective usage patterns for the various services can be automatically learned and extracted. Such information can be used to predict upcoming intervals of low usage and thus low impact across the dependent services to any particular service that is to be unavailable for a maintenance duration before a deadline. An improved schedule for maintenance can therefore be recommended, which will have lesser overall impact than some previous approaches.

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that is a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the over of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the specification refers generally to VCIs, the examples given could be any type of data compute node, including physical hosts, VCIs, non-VCI containers, and hypervisor kernel network interface modules. Embodiments of the present disclosure can include combinations of different types of data compute nodes.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 228 may reference element "28" in FIG. 2, and a similar element may be referenced as 928 in FIG. 9. Analogous elements within a Figure may be referenced with a hyphen and extra numeral or letter. Such analogous elements may be generally referenced without the hyphen and extra numeral or letter. For example, elements 116-1, 116-2, and 116-N in FIG. 1A may be collectively referenced as 116. As used herein, the designator "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1A is a diagram of an example of a container orchestration as an application in a system 100 for a maintenance recommendation for containerized services. The system 100 can include hosts 102 with processing resources 104 (e.g., a number of processors), memory resources 106, and/or a network interface 108. The hosts 102 can be included in a software defined data center 110. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API), which can be provided by a controller 112. The hosts 102 can be in communication with the controller 112. In some embodiments, the controller 112 can be a server, such as a web server.

The hosts 102 can incorporate a hypervisor 114 that can execute a number of virtual computing instances 116-1, 116-2, . . . , 116-N (referred to generally herein as "VCIs 116"). The VCIs can be provisioned with processing resources 104 and or memory resources 106 and can communicate via the network interface 108. The processing resources 104 and the memory resources 108 provisioned to the VCIs can be local and/or remote to the hosts 102. For example, in a software defined data center, the VCIs 116 can be provisioned with resources that are generally available to the software defined data center and not tied to any particular hardware device. By way of example, the memory resources 108 can include volatile and/or non-volatile memory available to the VCIs 116. The VCIs 116 can be moved to different hosts (not specifically illustrated), such that a different hypervisor 114 manages the VCIs 116.

In the example illustrated in FIG. 1A, the VCIs 116 are virtual machines ("VMs") that each include a container virtualization layer to provision a number of containers 118. With respect to the virtual machines 116, the hosts 102 can be regarded as virtual machine hosts. With respect to the containers provisioned from container images provided by a virtual machine (e.g., virtual machine 116-1), the virtual machine 116 and the container virtualization layer can be regarded as a container host. In FIG. 1A, the controller 112 hosts the container orchestration system 120 (e.g., a container cluster) as an application.

Figure 1B:
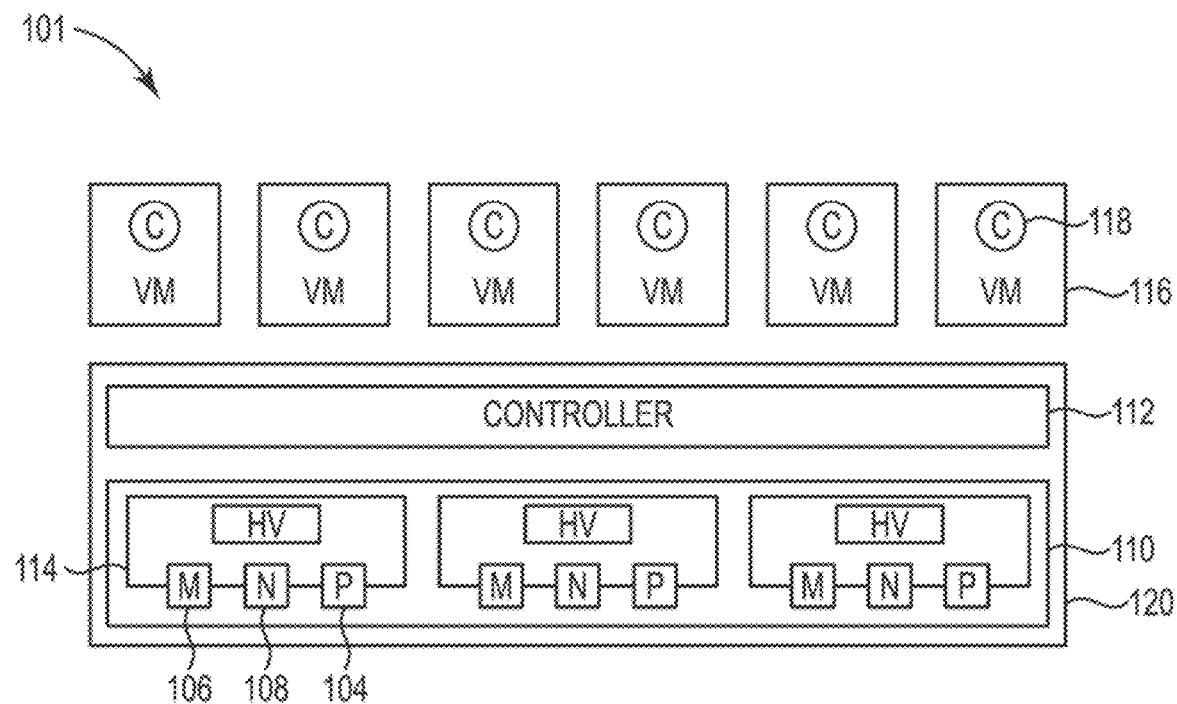
FIG. 1B is a diagram of an example of integrated container orchestration in a system for a maintenance recommendation for containerized services.

FIG. 1B is a diagram of an example of integrated container orchestration in a system 101 for a maintenance recommendation for containerized services. FIG. 1B is analogous to FIG. 1A, except that the container orchestration system 120 and the controller 112 are an embedded system. Furthermore, the virtual machines 116 can be referred to as pod virtual machines that each host a container 118. A pod is the smallest deployable unit of computing that can be created and managed by the container orchestration system 120. In contrast, in FIG. 1A, each VM 116 can provision a number of pods. A user can select one or more pods for maintenance and receive maintenance recommendations as described herein. The user can specify a duration of the maintenance and a deadline by which the maintenance needs to be completed.

Although not specifically illustrated in FIG. 1A or FIG. 1B, in at least one embodiment, the container orchestration system can be a third-party system not managed by the controller 112. In such embodiments, the controller 112 can function as a recommendation engine that can receive input from monitoring tools in order to provide the maintenance recommendation to the third-party container orchestration system. With respect to FIG. 1A and FIG. 1B, the controller 112 can function as both the recommendation engine and a monitoring engine. The recommendation engine and monitoring engine are described in more detail below.

Figure 2:
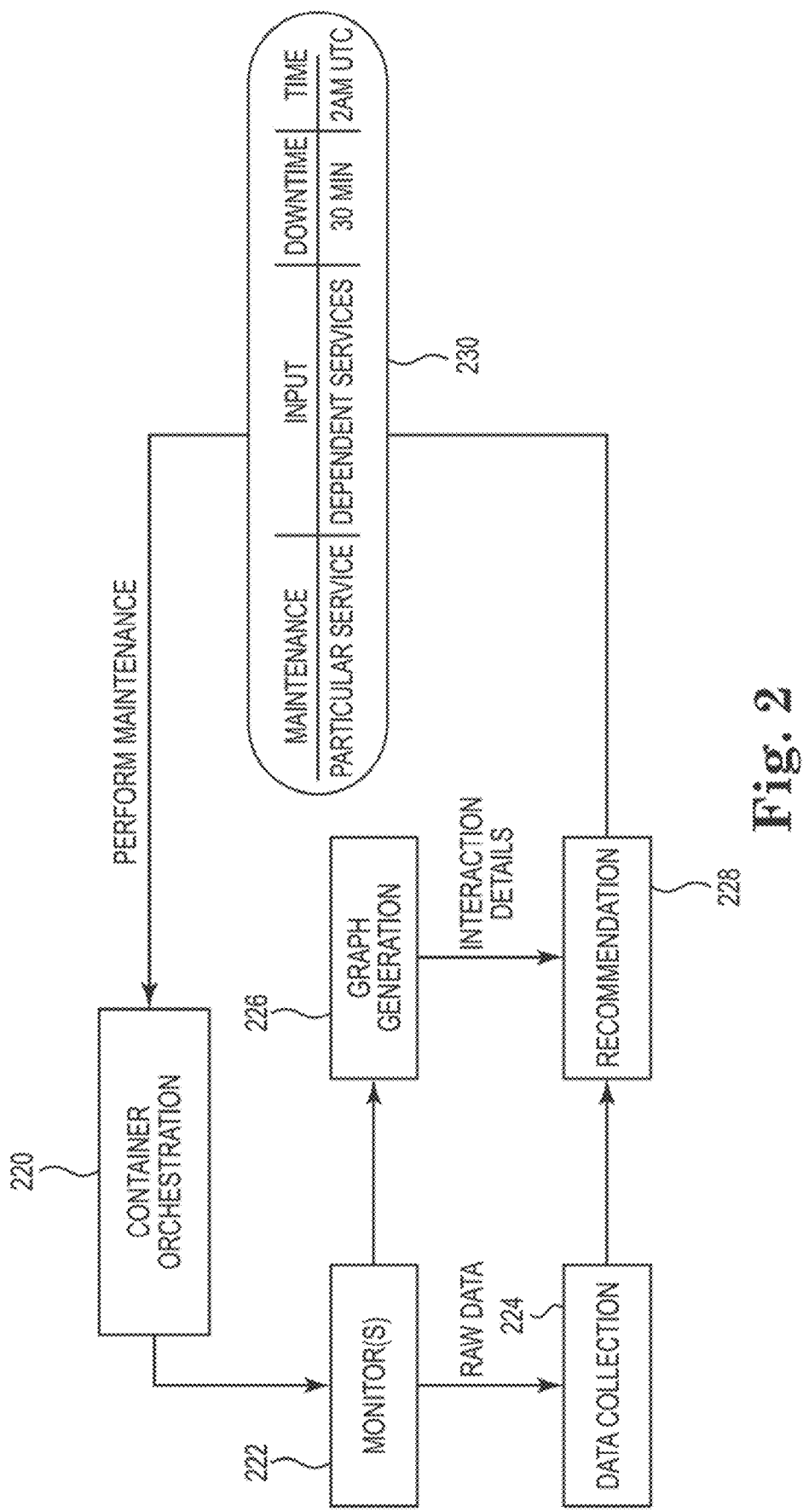
FIG. 2 is a block diagram illustrating an example system and method for a maintenance recommendation for containerized services.

FIG. 2 is a block diagram illustrating an example system and method for a maintenance recommendation for containerized services. A container orchestration system 220 can manage multiple applications with shared services between the applications. The container orchestration system 220 can be responsible for application deployment, scaling, and management, such as maintenance, and updates of the applications and/or services. One example of the container orchestration system 220 is Kubernetes, however, in some embodiments, the container orchestration system 220 can be implemented as described above with respect to FIG. 1A or FIG. 1B. The container orchestration system 220 can manage a container cluster.

One or more monitors 222 can have access to metrics and usage data of the services managed by the container orchestration system 220. In some instances, network administrators may already make use of various monitors 222 for their container orchestration system. The monitors 222 can store historical resource usage data that can be used to extract usage patterns. The monitors 222 can provide the raw data to a data collection engine 224 and/or to a graph generation engine 226. In at least one embodiment, the monitors 222 can include a resource usage monitor and a network interaction monitor.

The data collection engine 224 can receive resource usage metrics from the resource usage monitor. Resource usage metrics can include service-specific utilization data for resources such as processing resources, memory resources, network resources (e.g. input/output per second (IOPS) and/or bandwidth usage), disk time, disk space, etc. Resource usage metrics can also include mathematical measures such as rate of change of resource usage, such as may be useful in a case of monotonically increasing or decreasing resources like disk space used (which tends to increase with time). Using rate of change information can be helpful, for example, if a service has high usage at a particular time but is significantly decreasing usage over a short amount of time, which may indicate that an idle period is imminent. The contrapositive is also true (e.g., if a particular service has a low usage at a particular time but is significantly increasing usage over a short amount of time, an active period may be imminent. Table 1 presents a non-limiting example of such usage metrics:

TABLE 1

Resource utilization data for a particular pod for the last 4 observations

| Metric | Tn | Tn − 1 | Tn − 2 | Tn − 3 | ... |
|---|---|---|---|---|---|
| vCPU | 1.332 | 1.233 | 1.172 | 1.142 | ... |
| Memory | 2.44 GB | 2.44 GB | 2.10 GB | 2.22 GB | ... |
| Network IOPS | 44 Ops/s | 30 Ops/s | 10 Ops/s | 12 Ops/s | ... |

TABLE 1-continued

Resource utilization data for a particular pod for the last 4 observations

| Metric | Tn | Tn − 1 | Tn − 2 | Tn − 3 | ... |
|---|---|---|---|---|---|
| Network b/w | 850 Kb/s | 1.12 Mb/s | 1.20 Mb/s | 950 Kb/s | ... |
| Disk Time | 10 ms | 10 ms | 10 ms | 9 ms | ... |
| ... | ... | ... | ... | ... | ... |

The graph generation engine 226 can receive service interaction metrics from the network interaction monitor. The network interaction monitor can monitor network interaction between containers to obtain service interaction metrics including information about communication across services. Such information can be obtained, for example, by tracing and/or by using network logs in each container using operating system level commands (e.g., netstat) and then collating them. The count of network interactions among containers can be polled and aggregated for a given amount of time, as a user-configurable parameter. Table 2 presents a non-limiting example of such service interaction metrics:

TABLE 2

| Container level interactions | | |
|---|---|---|
| Network Source | Network Destination | Average Count/hr |
| Container A | Container B | 35 |
| Container C | Container B | 140 |
| Container B | Container D | 3 |

The graph generation engine 226 can use the service interaction metrics to construct a graph, such as a directed acyclic graph, representing the interactions among the different services in the container cluster. An example of such a graph is presented in FIG. 3.

The data collection engine 224 can provide aggregated resource utilization data to a recommendation engine 228. The graph generation engine 226 can provide interaction details to the recommendation engine 228. The recommendation engine can identify which services will be impacted when a particular service will be unavailable (e.g., due to expected downtime for maintenance). The recommendation engine 228 can detect usage patterns in services to identify a preferred time to perform maintenance on the particular service so that the collective impact in all the services is reduced or minimized. The recommendation engine 228 can provide a recommendation 230 to the container orchestration engine 220 that identifies the particular service on which maintenance is to be performed, the impact to other services, the duration of the maintenance, and a time to perform the maintenance. In some embodiments, the recommendation engine 228 can provide multiple recommendations in order to allow flexibility in scheduling (e.g., in case the first identified option, although perhaps preferential in terms of overall effect on the dependent services, is not convenient for an external reason not identified based on the data). The particular service and the maintenance duration can be user-specified values. Although not specifically illustrated, the user can also specify a maintenance deadline, which is a time by which the maintenance is to be performed. The recommendation engine 228 can provide information about patterns, historical trends, and the reasons why a particular recommendation was made. In some embodiments, the graph can be displayed to the user to allow the user to visualize the dependencies between services. Likewise, the information about patterns, historical trends, spikes in usage, and/or the graph can be exported as desired.

Figure 3:
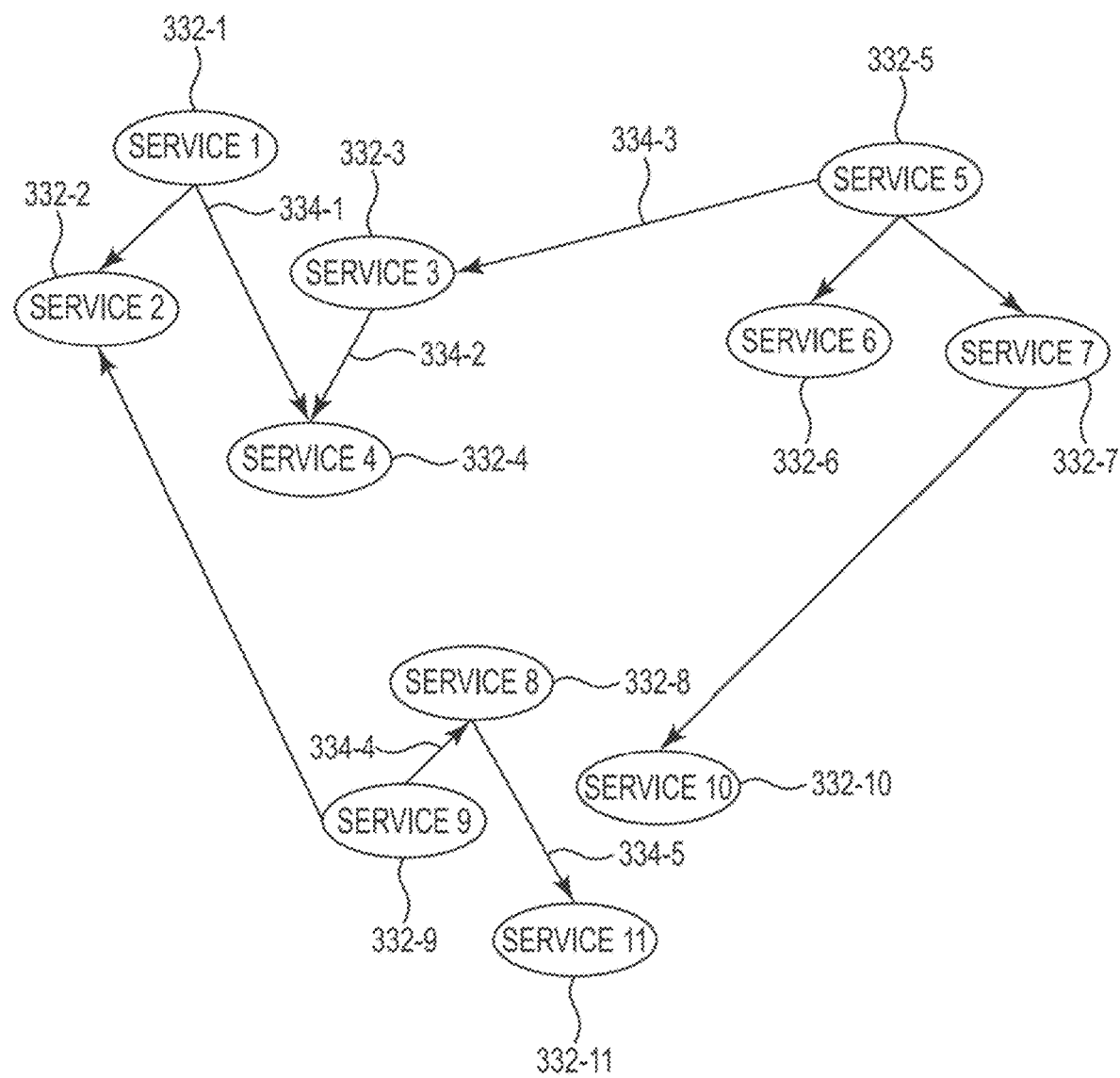
FIG. 3 is a graph illustrating an example of interactions among different services in a system for a maintenance recommendation for containerized services.

FIG. 3 is a graph illustrating an example of interactions among different services in a system for a maintenance recommendation for containerized services. The graph includes eleven services: a first service 332-1, a second service 332-2, a third service 332-3, a fourth service 332-4, a fifth service 332-5, a sixth service 332-6, a seventh service 332-7, an eighth service 332-8, a ninth service 332-9, a tenth service 332-10, and an eleventh service 332-11, (referred to generally as services 332) however embodiments are not limited to any particular quantity of services 332. The graph can be a directed acyclic graph, where each edge (the lines connecting services 332) represents the direction of interaction (by the direction of the arrow on the line connecting services 332). Although not specifically illustrated, the weight of each edge represents the number of average interactions (e.g., as indicated in Table 2). As illustrated in FIG. 2, the graph can be provided from the graph generation engine 226 to the recommendation engine 228.

For a particular service, which is to be unavailable for a maintenance duration, the graph can be traversed (e.g., by the recommendation engine 228 as illustrated in FIG. 2) to identify all of the paths arriving at the vertex representing the particular service. All services lying on a path arriving at the vertex are from dependent services because they are making calls to the particular service, either directly or indirectly. This implies that whenever the particular service is unavailable, the dependent services may also be unavailable. For example, the eighth service 323-8 and the ninth service 323-9 are dependent services of the eleventh service 323-11 since they lie on the same path having an incoming edge on the eleventh service 323-11. Similarly, the first service 323-1, the third service 323-3, and the fifth service 323-5 are dependent services of the fourth service 323-4.

Figure 4:
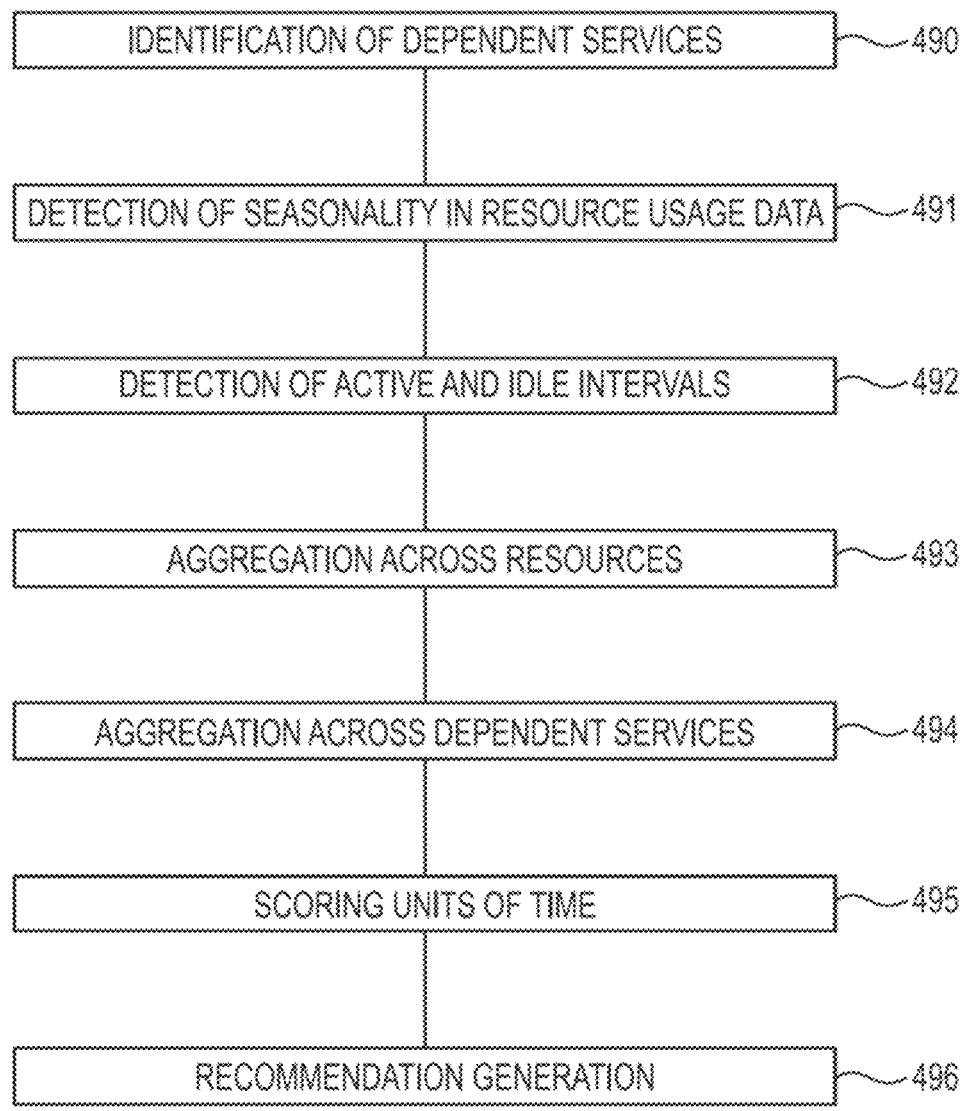
FIG. 4 is a flow chart illustrating an example of a method for a maintenance recommendation for containerized services.

FIG. 4 is a flow chart illustrating an example of a method for a maintenance recommendation for containerized services. At 490, the method can include identification of dependent services, such as is described above with respect to FIGS. 2-3.

At 491, the method can include detection of seasonality in resource usage data. The detection of seasonality can be performed, for example, by the recommendation engine 228 as illustrated in FIG. 2. In time series data, seasonality is the presence of variations that occur at specific regular intervals less than a year, such as daily, weekly, monthly, quarterly, etc. Seasonality may be caused by various factors such as work schedules, vacations, holidays, weekends, etc. Seasonality generally consists of periodic, repetitive, and generally regular patterns in the levels of a time series.

In at least one embodiment, a regression-based time series analysis that models the data as a composition of trends, seasonality, and noise can be used. Trend estimation can be used to relate measurements to the times at which they occurred and generally help determine whether time series data changes according to a linear function with time. Dummy variables can be used with each unite of time for which the data is recorded (e.g., hourly data). The dataset can be divided into training and validation data (e.g., at a 7:3 ratio). Several models can be applied, such as pure trend, trend with additive and multiplicative seasonality, etc. Corresponding error metrics, such as root mean square error, can be calculated for each model that is applied. If any seasonality model provides at least a threshold percentage better accuracy in both training and validation datasets than pure trend modeling, then it can be concluded that the data has seasonality. Other examples of forecasting methods for seasonality detection include autoregressive integrated moving average, Holt-Winters double exponential smoothing, etc.

Although not specifically illustrated in FIG. 4, for the detected seasonality, a periodicity can be detected. As used herein, periodicity refers to the seasonality span component (e.g., after how many hours the seasonal pattern repeats itself). A periodicity detection model can be applied to the detected seasonality. An example of such a model is the seasonal autoregressive moving average forecasting method. The periodicity can be detected, for example, using seasonal differencing with partial autocorrelation function using multiple lag values within the seasonal autoregressive moving average. The periodicity may be denoted herein as "P". The periodicity detection can be performed for each resource. In at least one embodiment, if no seasonality is found for the usage of any resource or if seasonality is found but the periodicity is different across the resources, then it can be concluded that the service has no conclusive seasonal behavior and no recommendation will be made. In some embodiments, when no recommendation is made, a notification is provided to the user (e.g., network administrator) indicating that the results are inconclusive and the user can schedule maintenance according to a previous approach.

At 492, the method can include detection of active and idle intervals in the resource utilization data. The division into active and idle intervals can help identify the interval when a seasonal increase in utilization happens and can help ignore seasonal workloads with minor resource variations, which might not be sufficient to confirm a hypothesis that the service is idle the rest of the time. Detection of the active and idle intervals can include a calculation of moving average values of resource utilization considering a window having a width equal to the periodicity (P) that slides across a width equal to two times the periodicity (2P). Threshold categorization values can be calculated that are a particular percentage greater and/or lesser than the moving average value of the resource utilization data at a given time. An example percentage for the threshold categorization values is 10%, however that value can be tuned based on further analysis and can be a user-defined threshold. For each data point in the time series data, a value that is within the threshold difference (greater or lesser than) of the moving average value at that time can be categorized as idle, while a value that is outside of the threshold difference of the moving average value at that time can be categorized as active.

If $T_t$ denotes the value of a trend component at time "t", then:

$$\varepsilon_{max(t)} = 1.10 * T_t$$

$$\varepsilon_{min(t)} = 0.90 * T_t$$

where the threshold (+/−10%) is a configurable parameter. If $V_t$ is the value of the resource utilization at time "t", then:

$$A = \{V_t | V_t \notin [\varepsilon_{max(t)}, \varepsilon_{min(t)}]\}$$

$$I = A'$$

where all points in set I (idle) lie between the two threshold values and A is the set of active values. It can be concluded that there is not much variation in the set I, except for the trend, which is why the set is categorized as idle. The values close to the trend are classified as idle because they are close to what the value would be without any seasonality. The values in set A are significantly different from the trend denoting the average rate of change in the utilization value.

Therefore, the values are categorized as active compared to the rest of the time series data.

With each unit of time series data having been categorized as active or idle, active intervals can be determined. A time interval window of width P can be used with different starting points between zero and P. Within every interval of the time interval window P starting between zero and P, a sub-interval with a maximum contiguous data points (from i to j) in set A can be selected. This sub-interval represents the candidate for active peak load.

Active Interval Candidate$_s$=max($A_i$-$A_j$), $A_i, A_j \in [s, P+s)$ $\forall S \in [0, P)$ S (the starting point of the time interval window) can be chosen to yield the maximum value of the active interval candidate, so that cases like a spike crossing, a boundary of the time interval window (the start/end of the chosen interval) is not ignored.

The time series can be divided into groups of length P, starting at the remainder (P % S). For each such window "k", the window can be divided into:

Active Interval=max(Active Interval Candidate$_k$)

Idle Interval=Window−Active Interval

Figure 5:
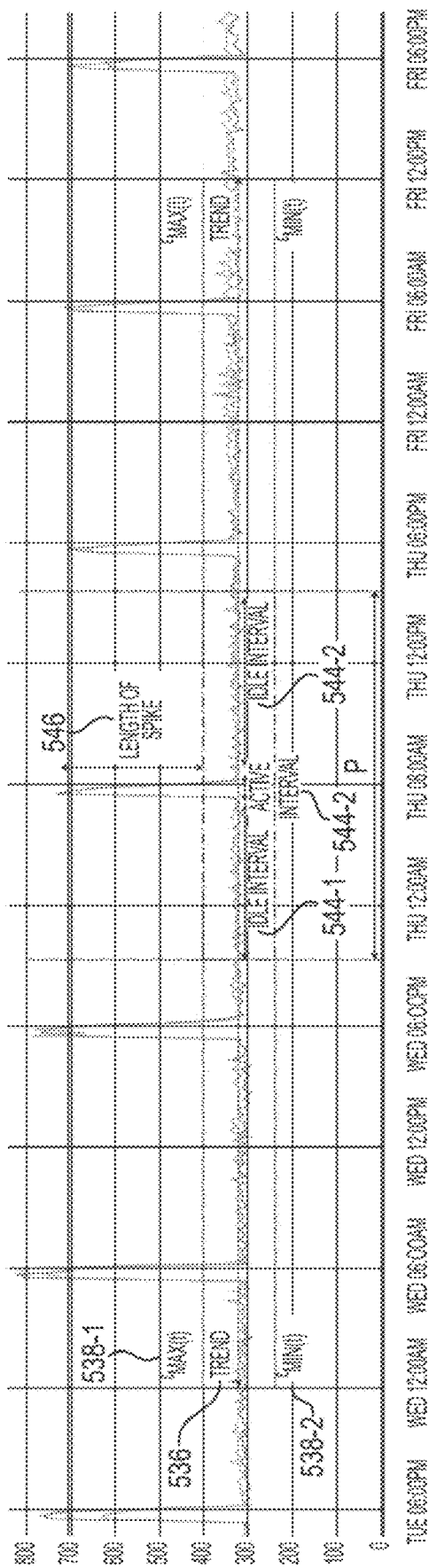
FIG. 5 is a plot of resource usage versus time illustrating an example of active and idle intervals according to one or more embodiments of the present disclosure.

FIG. 5 is a plot of resource usage versus time illustrating an example of active and idle intervals according to one or more embodiments of the present disclosure. An example of the results of element 492 in FIG. 4 is illustrated in FIG. 5. The vertical axis of the plot represents resource utilization and the horizontal axis represents time. The trend is illustrated at 536 and the threshold values $\varepsilon_{max(t)}$ 538-1 and $\varepsilon_{min(t)}$ 538-2 are illustrated surrounding the trend 536. For a particular instance of the time interval window 540 having width P, a categorized active interval 542 is illustrated surrounded by a first idle interval 544-1 and a second idle interval 544-2. The active interval 542 has a spike 546 in the resource utilization data. The process described with respect to element 492 in FIG. 4 can be repeated across the entire time duration in consideration (for as much of the historical data as desired) and the active and idle intervals can be categorized accordingly as illustrated in FIG. 6.

Figure 6:
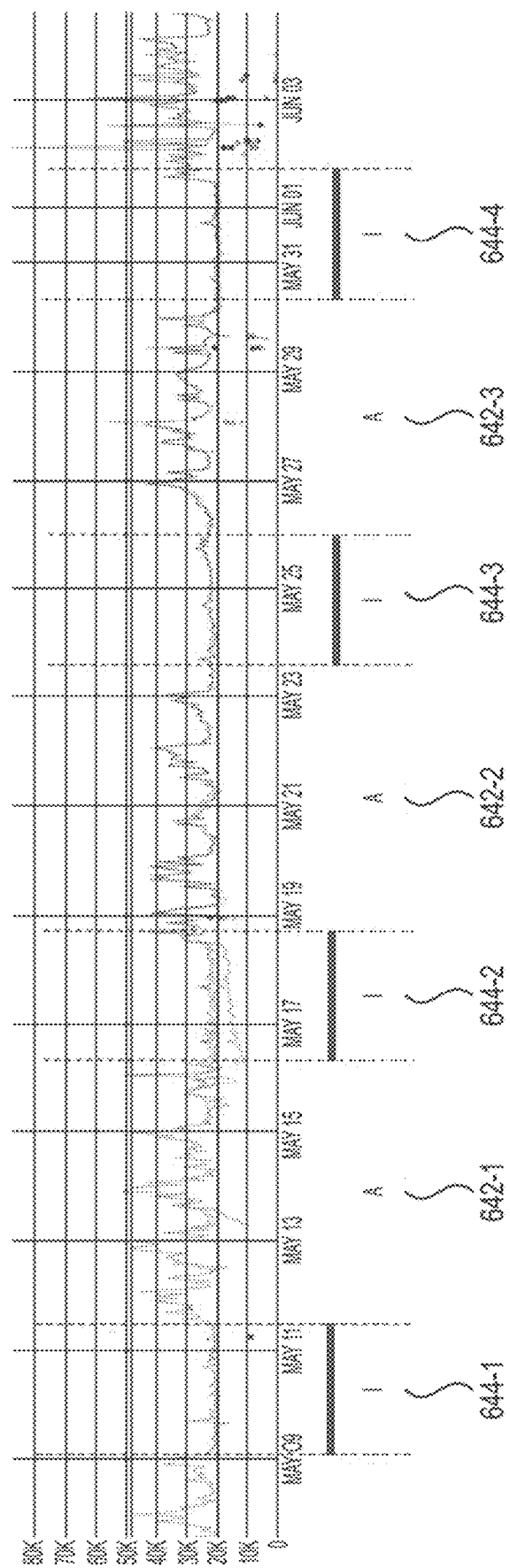
FIG. 6 is a plot of resource usage versus time illustrating examples of active and idle intervals according to one or more embodiments of the present disclosure.

FIG. 6 is a plot of resource usage versus time illustrating examples of active and idle intervals according to one or more embodiments of the present disclosure. As with FIG. 5, the vertical axis represents resource utilization and the horizontal axis represents time. However, in FIG. 6, the time axis covers a much longer duration. The plot includes a first idle interval 644-1 followed by a first active interval 642-1 followed by a second idle interval 644-2 followed by a second active interval 642-2 followed by a third idle interval 644-3 followed by a third active interval 642-3 followed by a fourth idle interval 644-4.

Returning to FIG. 4, at 493, the method can include aggregation across resources. The plots illustrated in FIG. 5 and FIG. 6 display resource usage data for only one resource each. The detection of seasonality in resource usage data at (491) and the detection of active and idle intervals (at 492) can be performed on a resource-by-resource basis. Once performed for more than one (or all resources, the active and idle intervals can be aggregated across the resources (at 493). An overlap of active intervals can be identified across resources over the desired duration of historical data:

$$\text{Total active interval} = \bigcup_r \text{Active interval}$$

If there is too overlap (or "union"), then the results are inconclusive and no recommendation is returned.

Figure 7:
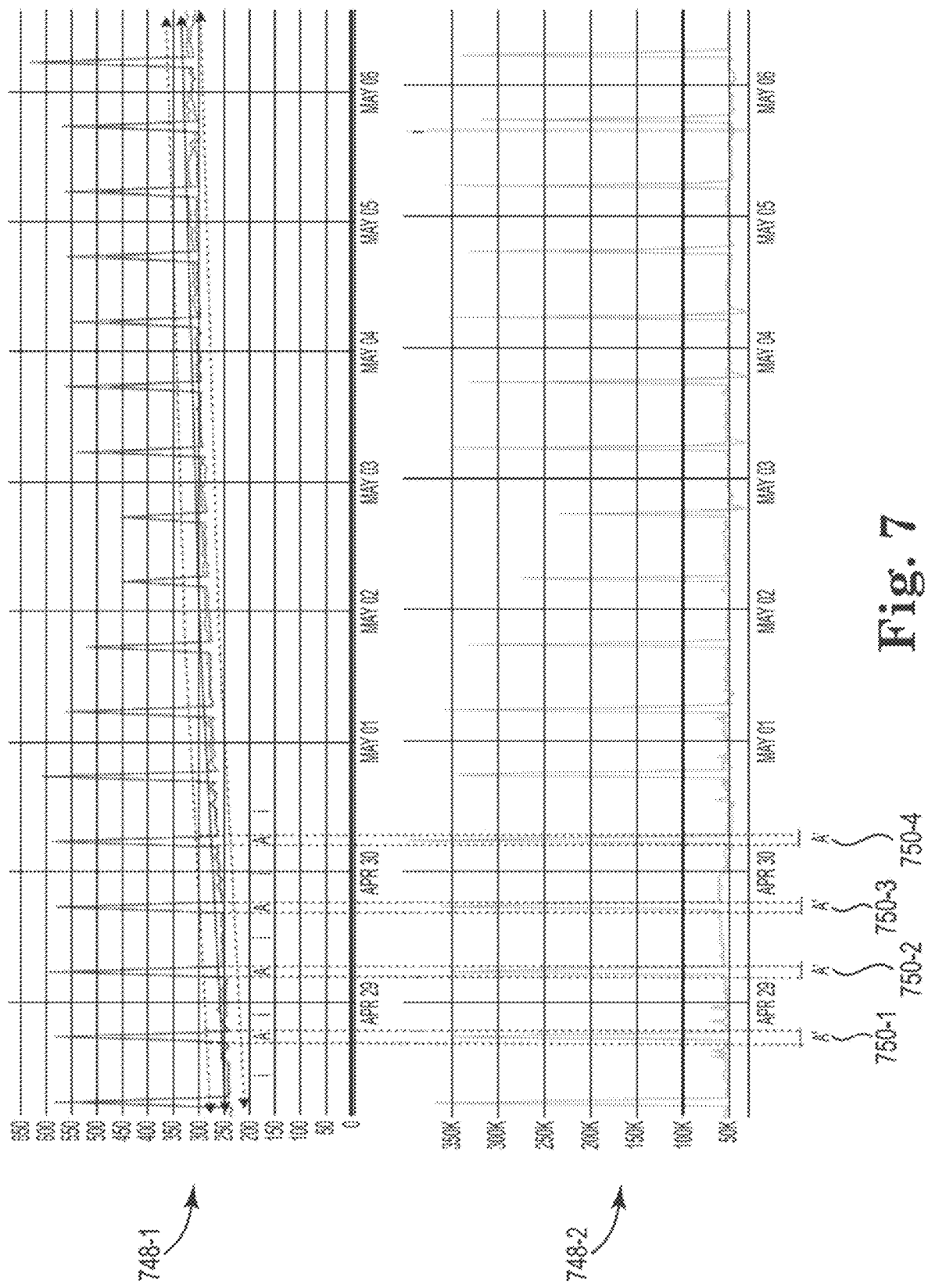
FIG. 7 is a plot illustrating an example of overlapped active and idle intervals across resources according to one or more embodiments of the present disclosure.

FIG. 7 is a plot illustrating an example of overlapped active intervals across resources according to one or more embodiments of the present disclosure. An example of the results of element 493 in FIG. 4 is illustrated in FIG. 7. The vertical axis of the plot represents resource utilization and the horizontal axis represents time. The upper portion of the plot corresponds to a first resource 748-1 (e.g., CPU usage) and the lower portion of the plot corresponds to a second resource 748-2 (e.g., network bandwidth). A trend is indicated for the first resource 748-1 by the linearly rising values as time increases. For a portion of the plot for the first resource 748-1, active intervals are denoted by "A" and idle intervals are denoted by "i". For a portion of the plot for the second resource 748-2, active intervals are denoted by "A'". A first overlapped active interval 750-1, a second overlapped active interval 750-2, a third overlapped active interval 750-3, and a fourth overlapped active interval 750-4 are illustrated. Other overlapped active intervals 750 may exist in the plot, but are not specifically denoted for ease of illustration. The overlapped active intervals do not have to match exactly (in terms of time), but need only overlap. For example, for the first overlapped active interval 750-1, the first resource 748-1 may be active from 5:30 to 6:00 and the second resource 748-2 may be active from 5:40 to 6:10. The union of the two active intervals would be represented by the overlapped active interval 750-1 from 5:30 to 6:10.

Figure 8:
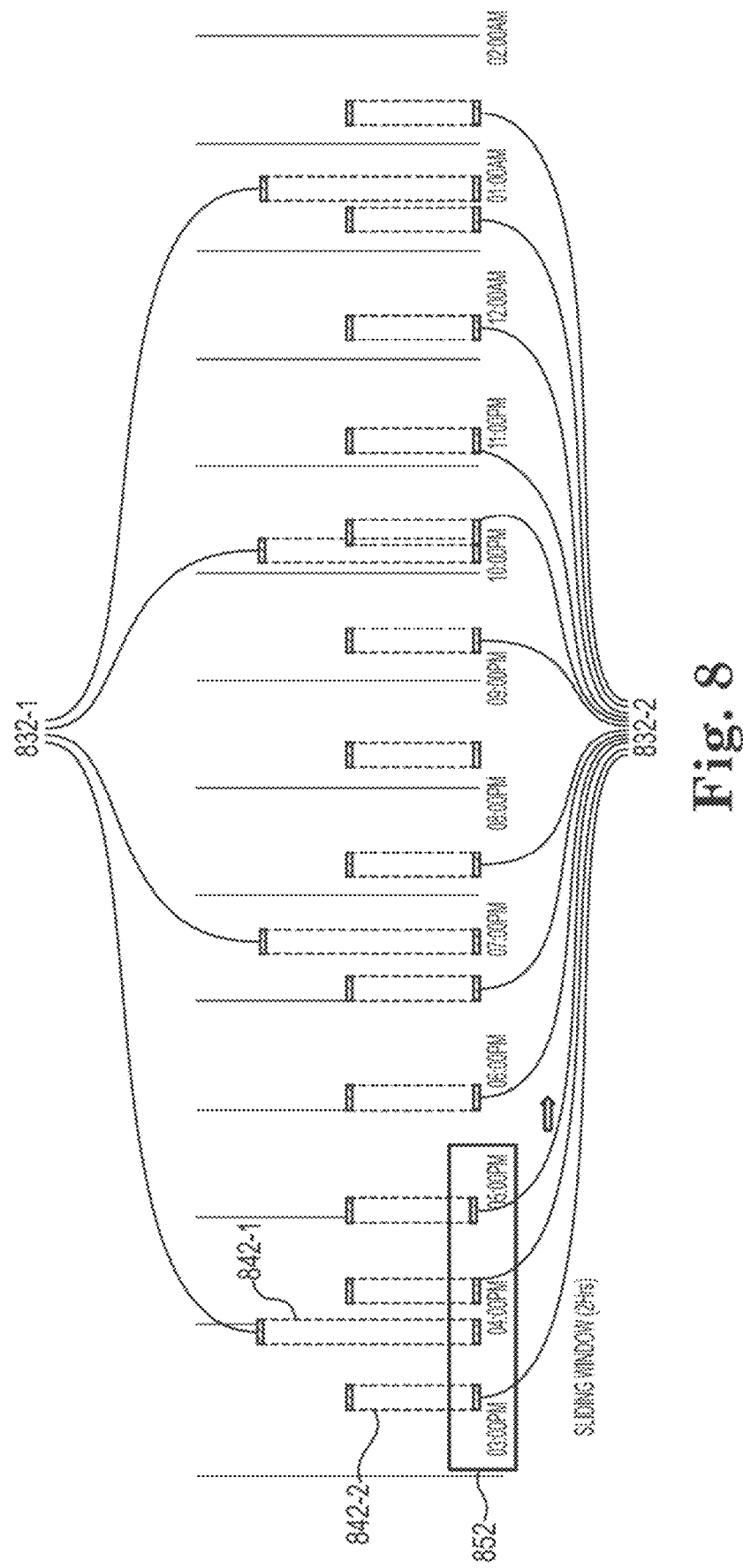
FIG. 8 is a plot illustrating an example of aggregated active intervals across services according to one or more embodiments of the present disclosure.

Returning to FIG. 4, at 494, the method can include aggregation across dependent services. Once the overall active intervals for the particular service are calculated, the process can be repeated to get the overlapped active intervals for each dependent service across resources. An example of the aggregation of active intervals across services and resources is shown in FIG. 8 as described in more detail below. The data can be projected up to the maintenance deadline provided by the user. Predicted active and idle intervals can be computed for the projected data.

At 495, the method can include scoring units of time. For each unit of time, a score can be assigned based on the quantity of services that are active during that unit of time. The unit of time represents the smallest granularity for which data is recorded (e.g., seconds, minutes, hours, etc.). In at least one embodiment, the score can be equal to the quantity of applications that are active during the unit of time.

FIG. 8 is a plot illustrating an example of aggregated active intervals across services according to one or more embodiments of the present disclosure. Each bar on the graph represents an aggregated active interval for a particular service. For ease of illustration, only two services are illustrated, however in practice, there may be many more than two services. Aggregated active intervals are illustrated for a first service 832-1 and for a second service 832-2. For example, an aggregated active interval 842-1 is illustrated for the first service 832-1 and an aggregated active interval 842-2 is illustrated for the second service 832-2.

A best suited maintenance interval can be determined. A sliding window 852 of a length equal to the maintenance duration can be used. As a non-limiting example, the maintenance duration, and thus the width of the sliding window 852 in FIG. 8 is two hours. The sliding window 852 can start at the current time. The scores within the sliding window 852 can be summed and then the window 852 can slide by one unit of time and a new sum of scores can be calculated repeatedly up to the point where the window 852 reaches the maintenance deadline. The position of the sliding window 852 with the least score represents the window in which all services collectively have the least active intervals. Therefore, performing maintenance in this window will have the least impact on the particular service and the dependent services.

Returning to FIG. 4, at 496, the method can include generating a recommendation. The recommendation can be to perform maintenance for the particular service during the widow with the least score as described above with respect to FIG. 8.

Figure 9:
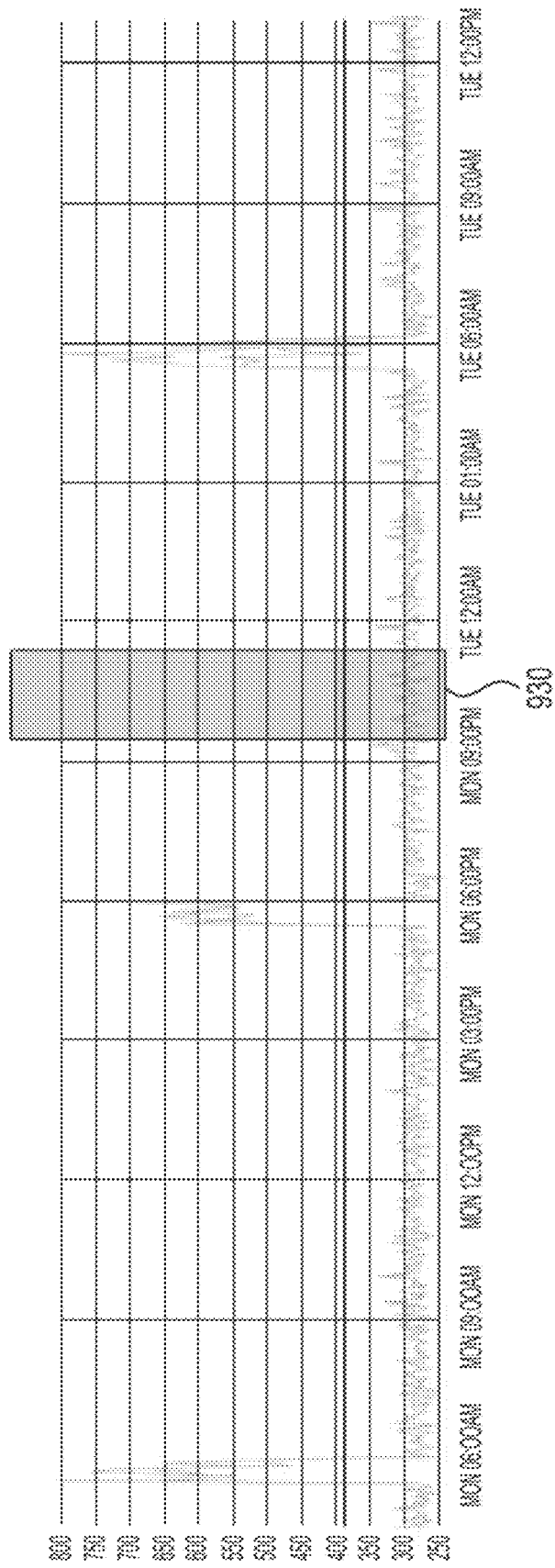
FIG. 9 is a plot of resource usage versus time illustrating an example recommendation according to one or more embodiments of the present disclosure.

FIG. 9 is a plot of resource usage versus time illustrating an example recommendation 930 according to one or more embodiments of the present disclosure. For ease of illustration, FIG. 9 only includes a single resource and a couple of services. As illustrated, the recommendation 930 is for a two hour maintenance duration at a relatively idle point in the resource utilization plot.

Figure 10:
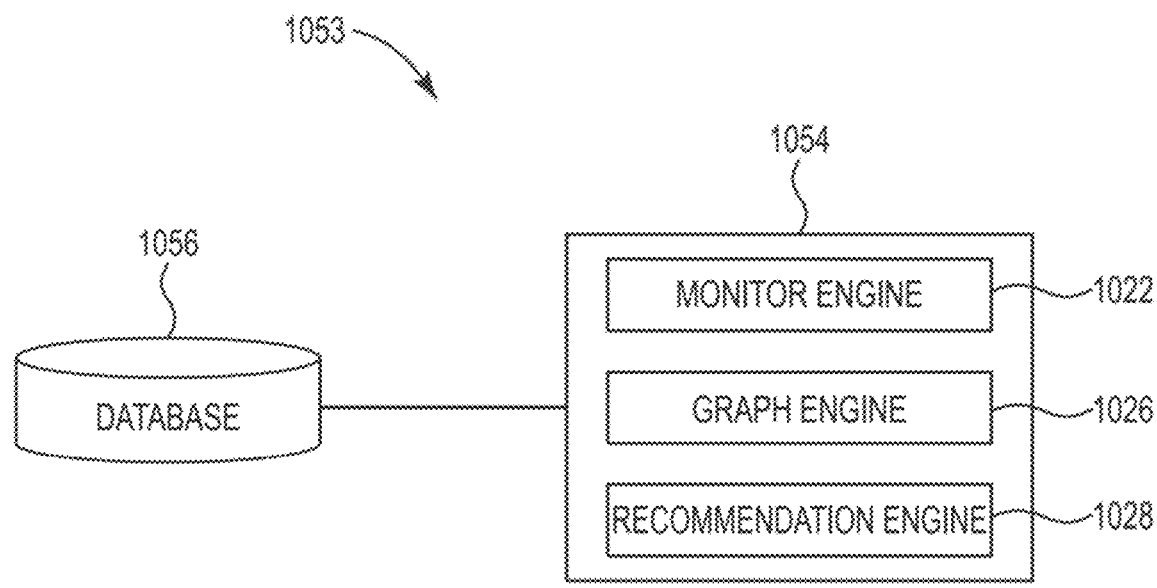
FIG. 10 is a diagram of an example of a system for a maintenance recommendation for containerized services.

FIG. 10 is a diagram of an example of a system 1053 for a maintenance recommendation for containerized services. The system 1053 can include a database 1056, a subsystem 1054, and/or a number of engines, for example a monitor engine 1022, a graph engine 1026, and/or a recommendation engine 1028, and can be in communication with the database 1056 via a communication link. The system 1053 can include additional or fewer engines than illustrated to perform the various functions described herein. The system can represent program instructions and/or hardware of a machine (e.g., machine 1158 as referenced in FIG. 11, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the monitor engine 1022 can include a combination of hardware and program instructions that is configured to collect time series data including resource usage by each of a plurality of services in a container cluster and network interactions between the plurality of services in the container cluster. The resource usage data can include time, series data for each of a plurality of resource types (e.g., CPU usage, memory usage, etc.).

In at least one embodiment, the monitor engine 1028 can be configured to collect the time series data at a user defined frequency and for a user defined duration.

In some embodiments, the graph engine 1026 can include a combination of hardware and program instructions that is configured to construct a graph with vertices representing the plurality of services, edges representing the network interactions, and edge weights representing average quantities of network interactions. Each of the vertices of the graph can originate at a first respective vertex and terminate at a second respective vertex representing a direction of interaction. The recommendation engine 1028 can be configured to traverse the graph and identify a subset of the vertices on paths having edges terminating at a vertex corresponding to the particular service. The subset of vertices corresponds to the subset of services.

In some embodiments, the recommendation engine 1028 can include a combination of hardware and program instructions that is configured to identify a subset of the plurality of services that will be affected by unavailability of a particular service based on the graph. The recommendation engine 1028 can be configured to determine a respective resource usage pattern, if any, for the particular service and each of the subset of services based on the resource usage data. The recommendation engine 1028 can be configured to recommend a time to perform maintenance on the particular service based on the respective resource usage patterns. In at least one embodiment, the recommendation engine 1028 can be configured to receive a user definition of the particular service and to display the graph to the user.

The recommendation engine 1028 can include a combination of hardware and program instructions that is configured to detect a respective seasonality, if any, in the resource usage data for each of the plurality of resource types. The recommendation engine 1028 can be configured to detect a respective periodicity, if any, in the resource usage data having detected seasonality for each of the plurality of resource types. The recommendation engine 1028 can be configured to calculate a moving average value of resource utilization based on the periodicity and to categorize the resource usage data as active or idle based on whether the resource utilization data is within a threshold difference from the moving average value. In some embodiments, the recommendation engine 1028 can include a combination of hardware and program instructions that is configured to model the resource usage data as a composition of trends, seasonality, and noise and to detect the respective resource usage patterns in response to the seasonality model providing better accuracy in training and validation data than the trend model by a threshold amount.

Although not specifically illustrated, the system 1053 can include a container orchestration engine including a combination of hardware and program instructions that is configured to provide the plurality of services and to perform maintenance on the particular service according to the recommendation.

Figure 11:
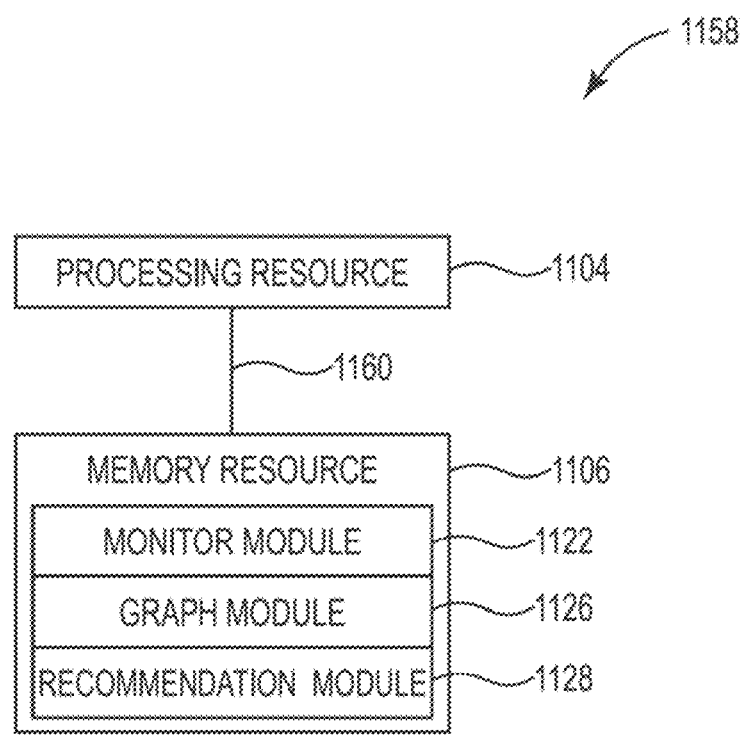
FIG. 11 is a diagram of an example of a machine for a maintenance recommendation for containerized services.

FIG. 11 is a diagram of an example of a machine 1158 for a maintenance recommendation for containerized services. The machine 1158 can utilize software, hardware, firmware, and/or logic to perform a number of functions. The machine 1158 can be a combination of hardware and program instructions configured to perform a number of functions (e.g., actions). The hardware, for example, can include a number of processing resources 1104 and a number of memory resources 1106, such as a machine-readable medium (MRM) or other memory resources 1106. The memory resources 1106 can be internal and/or external to the machine 1158 (e.g., the machine 1158 can include internal memory resources and have access to external memory resources). In some embodiments, the machine 1158 can be a VCI. The program instructions (e.g., machine-readable instructions (MRI)) can include instructions stored on the MRM to implement a particular function (e.g., an action such as recommending a time to perform maintenance on a particular service, as described herein). The set of MRI can be executable by one or more of the processing resources 1104. The memory resources 1106 can be coupled to the machine 1158 in a wired and/or wireless manner. For example, the memory resources 1106 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 1106 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EE-PROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 1104 can be coupled to the memory resources 1106 via a communication path 1160. The communication path 1160 can be local or remote to the machine 1158. Examples of a local communication path 1160 can include an electronic bus internal to a machine, where the memory resources 1106 are in communication with the processing resources 1104 via the electronic bus. Examples of such electronic buses can include Industry Standard Architecture (ISA), Peripheral Component Interconnect (PCI), Advanced Technology Attachment (ATA), Small Computer System interface (SCSI), Universal Serial Bus (USB), among other types of electronic buses and variants thereof. The communication path 1160 can be such that the memory resources 1106 are remote from the processing resources 1104, such as in a network connection between the memory resources 1106 and the processing resources 1104. That is, the communication path 1160 can be a network connection. Examples of such a network connection can include a local area network (LAN), wide area network (WAN), personal area network (PAN), and the Internet, among others.

As shown in FIG. 11, the MRI stored in the memory resources 1106 can be segmented into a number of modules 1122, 1126, 1128 that when executed by the processing resources 1104 can perform a number of functions. As used herein a module includes a set of instructions included to perform a particular task or action. The number of modules 1122, 1126, 1128 can be sub-modules of other modules. For example, the graph module 1126 can be a sub-module of the monitor module 1122 and/or can be contained within a single module. Furthermore, the number of modules 1122, 1125, 1128 can comprise individual modules separate and distinct from one another. Examples are not limited to the specific modules 1122, 1126, 1128 illustrated in FIG. 1.

Each of the number of modules 1122, 1126, 1128 can include program instructions and/or a combination of hardware and program instructions that, when executed by a processing resource 1104, can function as a corresponding engine as described with respect to FIG. 10. For example, the recommendation module 1128 can include program instructions and/or a combination of hardware and program instructions that when executed by a processing resource 1104, can function as the recommendation engine 1028, though embodiments of the present disclosure are not so limited.

Figure 12:
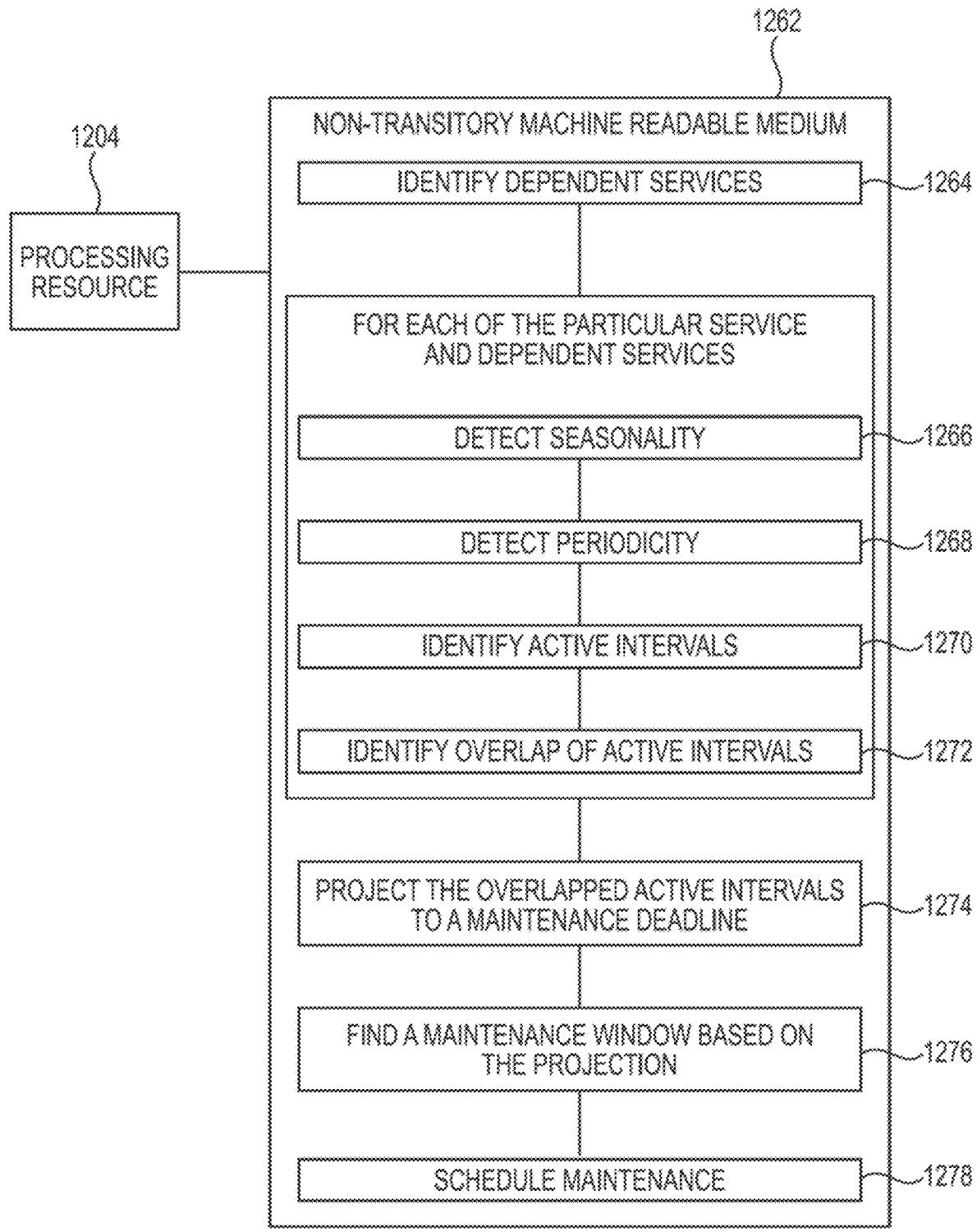
FIG. 12 is a diagram of an example of a machine-readable medium for a maintenance recommendation for containerized services.

FIG. 12 is a diagram of an example of a machine-readable medium 1262 for a maintenance recommendation for containerized services. The machine readable medium 1262 can store instructions executable by a processing resource 1204. For example, as illustrated at 1264 the machine readable medium 1262 can store instructions to identify services that are dependent on a particular service in a container cluster. The particular service is to be unavailable for a maintenance duration before a deadline.

For the particular service and dependent services, the instructions can be executed to detect seasonality in resource utilization data on a per-resource basis at 1266, detect periodicity for the detected seasonality at 1268, identify active intervals on a per-resource basis in the resource utilization data based on the detected periodicity at 1270, and identify overlap of active intervals across resources at 1272. The instructions can be executed to identify idle intervals on a per-resource basis in the resource utilization data based on the detected periodicity. The instructions can be executed to detect the periodicity for the detected seasonality on a per-resource basis and to determine that the periodicity does not exist unless the periodicity for each resource is equivalent.

The instructions can be executable to project the overlapped active intervals to the deadline, as illustrated at 1274. The instructions can be executed to find a window, equal to the maintenance duration, within which less than a threshold quantity of the dependent services and the particular service are active based on the projection, as illustrated at 1276. The instructions can be executed to find the window within which a minimum quantity of the dependent services and the particular service are active. The instructions can be executed to assign a respective score equal to a quantity of the dependent services and the particular service that are active for each unit of time for which the resource utilization data is recorded. The instructions can be executed to sum the respective scores for each position of a sliding window, equal to the maintenance duration, within the projection. Each successive position of the sliding window moves by one unit of time. The instructions can be executed to select one of the positions of the sliding widow having a minimum sum. The instructions can be executed to schedule maintenance for the particular service during the window, as illustrated at 1278.

Figure 13:
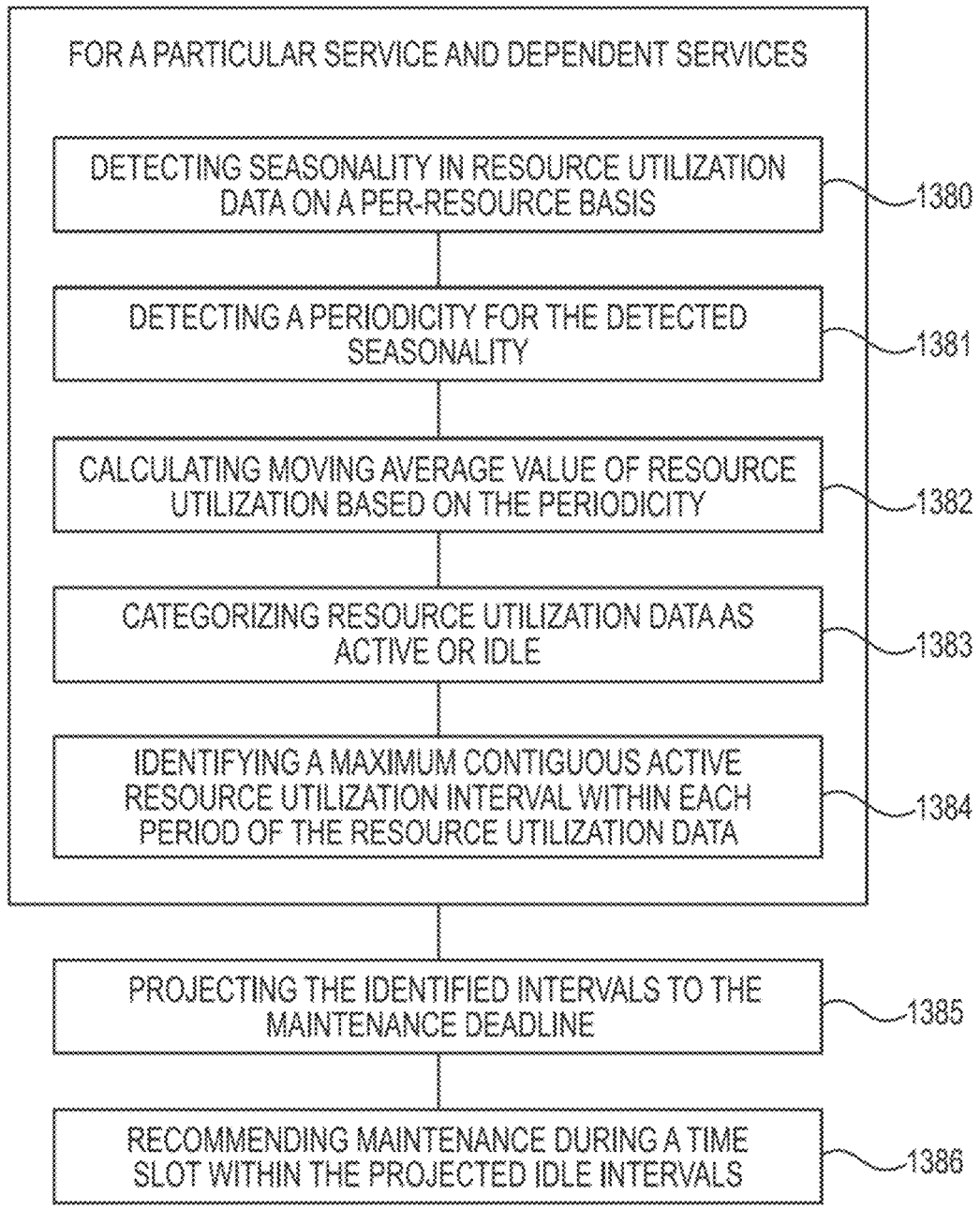
FIG. 13 is a flow chart illustrating an example of a method for a maintenance recommendation for containerized services.

FIG. 13 is a flow chart illustrating an example of a method for a maintenance recommendation for containerized services. For a particular service and dependent services, the method can include detecting seasonality in resource utilization data on a per-resource basis as illustrated at 1380. At 1381, the method can include detecting a periodicity for the detected seasonality. At 1382, the method can include calculating a respective moving average value of resource utilization based on the periodicity. At 1383, the method can include categorizing the resource utilization data, for each unit of time for which the resource utilization data is recorded, as active or idle based on whether the resource utilization is within a threshold difference from the moving average value.

At 1384, the method can include identifying a respective maximum contiguous active resource utilization internal within each of a plurality of periods of the resource utilization data based on the categorization as an active interval and a remainder of each period as an idle interval. The identifying can include determining a respective maximum contiguous active resource utilization interval for each position of at sliding window, having a width and slide based on the periodicity and using the position of the sliding window that yields a greatest respective maximum contiguous active resource utilization interval as the first period. The method can include dividing the resource utilization data into periods based on the periodicity and the greatest respective maximum contiguous active resource utilization interval for the first period. The method can include determining a starting point for the position of the sliding window such that neither end of the sliding window at the starting point overlaps with active resource utilization. In some embodiments, the width and the slide are equal to the periodicity.

At 1385, the method can include projecting the identified intervals to the maintenance deadline. At 1386, the method can include recommending maintenance for the particular service during a time slot, equal to a maintenance duration, within the projected idle intervals. Although not specifically illustrated, the method can further include receiving network interaction data from a network monitor associated with a container orchestration engine for the container cluster and identifying the plurality of dependent services based arm the network interaction data.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims, reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
   processing resources;
   memory resources; and
   a controller coupled to the processing resources and the memory resources, wherein the controller is configured to:
   host a container cluster and provision containers within the container cluster with resources including at least the processing resources and the memory resources;
   collect time series data including:
   resource utilization by each of a plurality of services in the container cluster; and
   network interactions between the plurality of services in the container cluster;
   construct a graph with vertices representing the plurality of services, edges representing the network interactions, and edge weights representing average quantities of network interactions; and
   identify a subset of the plurality of services that will be affected by unavailability of a particular service based on the graph;
   determine a respective resource usage pattern, if any, for the particular service and each of the subset of services based on the resource utilization data; and
   recommend a time to perform maintenance on the particular service based on the respective resource usage patterns.

2. The system of claim 1, wherein each of the vertices originates at a first respective vertex and terminates at a second respective vertex representing a direction of interaction;
   wherein the controller is configured to traverse the graph and identify a subset of the vertices on paths having edges terminating at a vertex corresponding to the particular service; and
   wherein the subset of vertices corresponds to the subset of services.

3. The system of claim 1, wherein the resource utilization data includes time series data for each of a plurality of resource types;
   wherein the controller is configured to detect a respective seasonality, if any, in the resource utilization data for each of the plurality of resource types.

4. The system of claim 3, wherein the controller is configured to detect a respective periodicity, if any, in the resource utilization data having detected seasonality for each of the plurality of resource types.

5. The system of claim 4, wherein the controller is configured to:
   calculate a moving average value of resource utilization based on the periodicity; and
   categorize the resource utilization data as active or idle based on whether the resource utilization data is within a threshold difference from the moving average value.

6. The system of claim 1, wherein the controller is configured to:
   model the resource utilization data as a composition of trends, seasonality, and noise; and
   detect the respective resource usage patterns in response to the seasonality model providing better accuracy in training and validation data than the trend model by a threshold amount.

7. The system of claim 1, wherein the controller is configured to:
   provide the plurality of services; and
   perform maintenance on the particular service according to the recommendation.

8. The system of claim 1, wherein the controller is further configured to:
   collect the time series data at a user defined frequency and for a user defined duration;
   receive a user definition of the particular service; and
   display the graph to the user.

9. A non-transitory machine-readable medium having instructions stored thereon, the instructions executable by a machine to:
   host a container cluster and provision containers within the container cluster with resources including at least processing resources and memory resources;

identify services that are dependent on a particular service in the container cluster, wherein the particular service is to be unavailable for a maintenance duration before a deadline;
for the particular service and each of the dependent services respectively:
  detect seasonality in resource utilization data on a per-resource basis;
  detect a periodicity for the detected seasonality;
  identify active intervals on a per-resource basis in the resource utilization data based on the detected periodicity; and
  identify overlap of the active intervals across resources;
project the overlapped active intervals to the deadline;
find a window, equal to the maintenance duration, within which less than a threshold quantity of the dependent services and the particular service are active based on the projection; and
schedule maintenance for the particular service during the window.

10. The medium of claim 9, wherein the instructions to find the window comprise instructions to find the window within which a minimum quantity of the dependent services and the particular service are active.

11. The medium of claim 9, wherein the instructions to find the window further comprise instructions to assign a respective score equal to a quantity of the dependent services and the particular service that are active for each unit of time for which the resource utilization data is recorded.

12. The medium of claim 11, wherein the instructions to find the window further comprise instructions to:
  sum the respective scores for each position of a sliding window, equal to the maintenance duration, within the projection;
  wherein each successive position of the sliding window moves by one unit of time; and
  select one of the positions of the sliding window having a minimum sum.

13. The medium of claim 9, further including instructions to identify idle intervals on a per-resource basis in the resource utilization data based on the detected periodicity.

14. The medium of claim 13, wherein the instructions to detect the periodicity for the detected seasonality further comprise instructions to:
  detect the periodicity for the detected seasonality on a per-resource basis; and
  determine that the periodicity does not exist unless the periodicity for each resource is equivalent.

15. A method, comprising:
  hosting, by a controller, a container cluster and provisioning containers within the container cluster with resources including at least processing resources and memory resources;
  by the controller and for a particular service and each of a plurality of services dependent thereon in a container cluster:
    detecting seasonality in resource utilization data on a per-resource basis;
    detecting a periodicity for the detected seasonality;
    calculating a respective moving average value of resource utilization based on the periodicity;
    categorizing the resource utilization data, for each unit of time for which the resource utilization data is recorded, as active or idle based on whether the resource utilization is within a threshold difference from the moving average value;
    identifying a respective maximum contiguous active resource utilization interval within each of a plurality of periods of the resource utilization data based on the categorization as an active interval and a remainder of each period as an idle interval;
  projecting, by the controller, the identified intervals to the maintenance deadline; and
  recommending, by the controller, maintenance for the particular service during a time slot, equal to a maintenance duration, within the projected idle intervals.

16. The method of claim 15, wherein identifying the respective maximum contiguous active resource utilization interval for a first of the plurality of periods comprises:
  determining a respective maximum contiguous active resource utilization interval for each position of a sliding window, having a width and slide based on the periodicity; and
  using the position of the sliding window that yields a greatest respective maximum contiguous active resource utilization interval as the first period.

17. The method of claim 16, further comprising dividing the resource utilization data into periods based on the periodicity and the greatest respective maximum contiguous active resource utilization interval for the first period.

18. The method of claim 16, further comprising determining a starting point for the position of the sliding window such that neither end of the sliding window at the starting point overlaps with active resource utilization.

19. The method of claim 16, wherein the width and the slide are equal to the periodicity.

20. The method of claim 15, further comprising:
  receiving network interaction data from a network monitor associated with a container orchestration engine for the container cluster; and
  identifying the plurality of dependent services based on the network interaction data.

* * * * *